W. P. & S. G. THOMSON.
RAIL JOINT.
APPLICATION FILED DEC. 1, 1908.

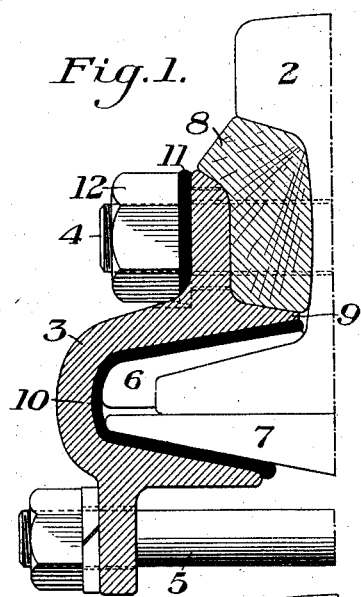
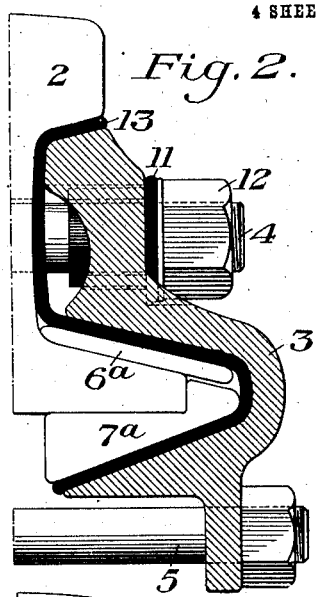
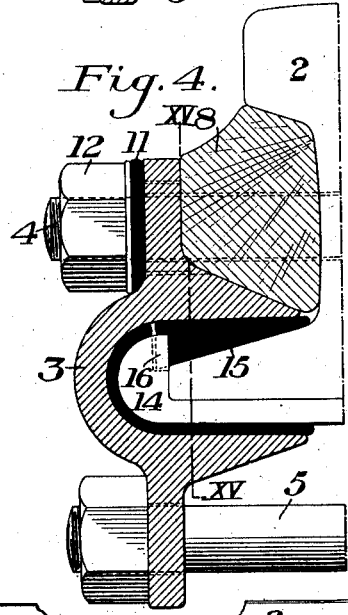
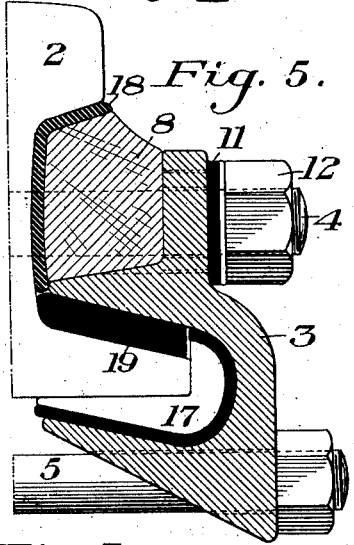
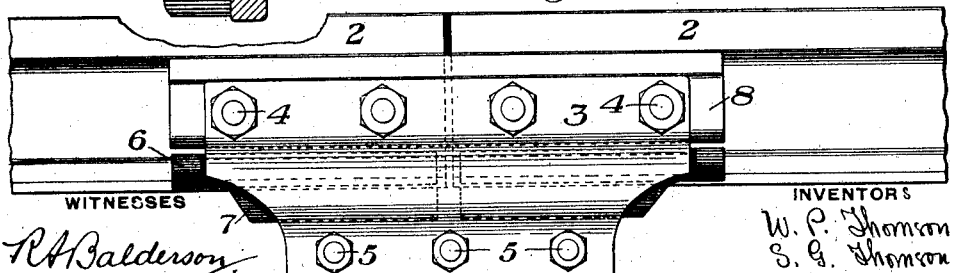

975,376.

Patented Nov. 8, 1910.
4 SHEETS—SHEET 2.

WITNESSES
R. A. Balderson
G. L. Winters

INVENTORS
W. P. Thomson
S. G. Thomson
by Bakewell, Byrnes & Parmelee,
their Attys

W. P. & S. G. THOMSON.
RAIL JOINT.
APPLICATION FILED DEC. 1, 1908.

975,376.

Patented Nov. 8, 1910.

4 SHEETS—SHEET 3.

WITNESSES
R A Balderson
G L Albenteve

INVENTORS
W. P. Thomson
S. G. Thomson,
by Bakewell, Byrnes & Parmelee,
their attys

W. P. & S. G. THOMSON.
RAIL JOINT.
APPLICATION FILED DEC. 1, 1908.

975,376.

Patented Nov. 8, 1910.
4 SHEETS—SHEET 4.

WITNESSES
R A Balderson
Jesse B. Heller

INVENTORS
Wm P. Thomson
S. G. Thomson
by Bakewell, Byrnes & Parmelee
their Attys.

UNITED STATES PATENT OFFICE.

WILLIAM P. THOMSON AND SAMUEL G. THOMSON, OF PHILADELPHIA, PENNSYLVANIA, ASSIGNORS TO THOMSON-THOMSON COMPANY, OF PHILADELPHIA, PENNSYLVANIA, A PARTNERSHIP.

RAIL-JOINT.

975,376.        Specification of Letters Patent.        Patented Nov. 8, 1910.

Original application filed December 27, 1907, Serial No. 408,295. Divided and this application filed December 1, 1908. Serial No. 465,548.

*To all whom it may concern:*

Be it known that we, WILLIAM P. THOMSON and SAMUEL G. THOMSON, both of Philadelphia, in the county of Philadelphia and State of Pennsylvania, have invented a new and useful Improvement in Rail-Joints, of which the following is a full, clear, and exact description, reference being had to the accompanying drawings, forming part of this specification, in which—

Figure 14:
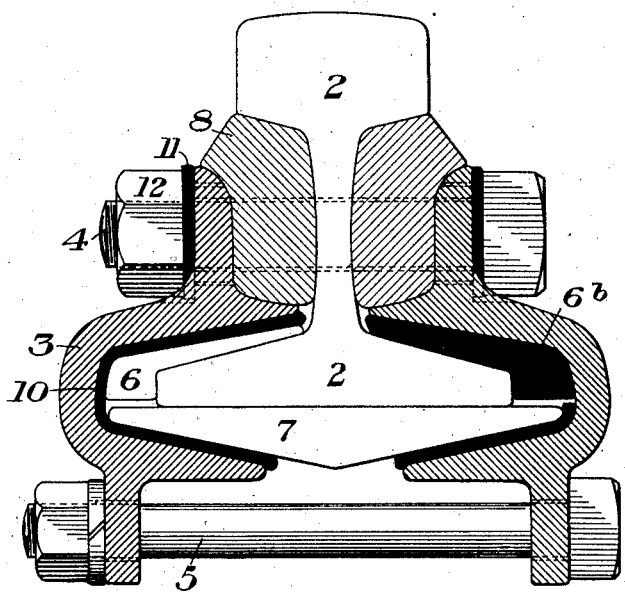
Figure 15:
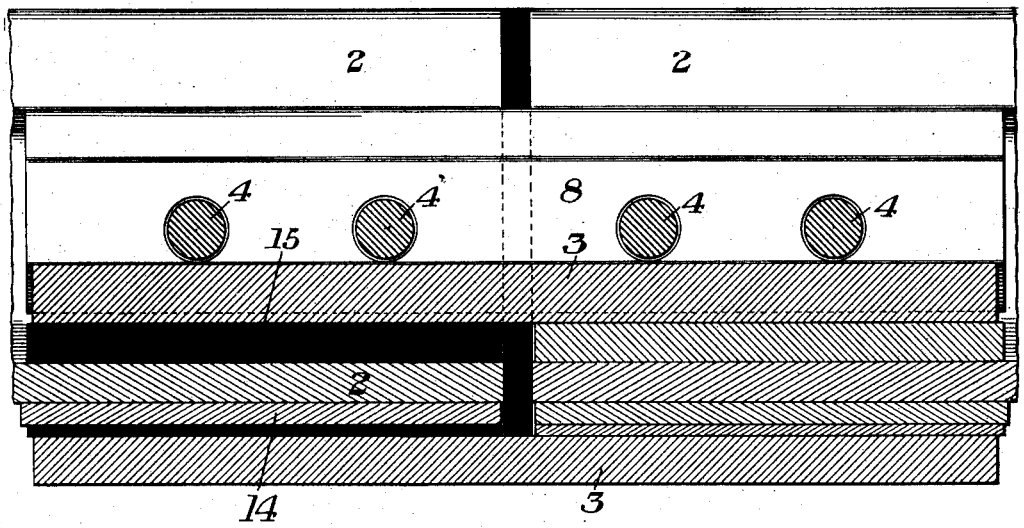

Figures 1, 2, 4, 5, 6, 7, 8, 9, 10, 11, 12 and 13 are sectional views showing different forms of our improved joint; and Fig. 3 is a side view of the joint shown in Fig. 1. Fig. 14 is a cross-section of a complete joint of the form shown in Fig. 1; and Fig. 15 is a longitudinal section taken on the line XV—XV of Fig. 4.

This application is in part for matter divided out of our Patent No. 967,687.

Our invention has relation to rail joints, and is designed to provide a joint in which the bearing surface at the rail end is increased beyond the edge of the rail base by the use of inside bars, in combination with outside bars in the peculiar manner hereinafter described and claimed.

In these drawings, the numeral 2 wherever seen, designates the rails, 3 designates the outer splice bars, 4 the joint bolts passing through the rails and securing the joint members thereto, and 5 are bolts passing through depending portions or flanges of the outer bars below the rail bases.

Referring first to the form of our invention shown in Fig. 1, the inside plate or bar is shown as formed in the two sections 6 and 7, the section 6 fitting over the top of the rail base and against its outer edge, while the other section extends under the foot or base of the rail and beyond both edges of the rail. A block 8 of wood or other insulating material is fitted underneath the heads of the rails, between the rail webs and the upper portions of the outer splice bar 3, being carried upon the inward projection 9 of said splice bar.

10 designates insulating material separating the members 6 and 7 from the splice bar 3, and 11 is insulating material which insulates the nut 12 and the bolt 4 from the upper portion of the splice bar 3. This form of joint is shown in side elevation in Fig. 3, from which it will be seen that the wooden block 8 is continuous across the joint, while the metal plates 6 and 7 above and below the rail base are discontinuous, there being separate plates at each end of the joint.

The form of invention shown in Fig. 2 is similar to that shown in Fig. 1, except that the members 6ª and 7ª of the inside bar or plate are of somewhat different form. The member 6ª which fits the top of the rail base is of flat plate form, while the member 7ª which lies underneath the rail base is shaped to fit the edge of the rail base as well as its under side. This form of the member 7ª is more particularly adapted for use where it is not intended to extend entirely underneath the rail base, but with a separate piece at each side of the rail. In this form the filler block 8 is omitted and the outer splice bar 3 is carried up under the head of the rail in the manner of the ordinary splice bar with intervening insulation 13.

Fig. 4 shows a section of a joint similar to Fig. 1, except that the inside plate 14, which contacts with the bottom of the rail extends upwardly above the top face of the rail base, and a thick piece of insulating material 15 is substituted for the metal plate 6 contacting with the top of the rail foot. This substitution is preferable on one flange only of each rail, metal pieces of similar sections alternating with the fiber insulation on the opposite side of the same rail and on the same side of different rails; and these pieces, whether metal or fiber fitting into a recess 16 in the plate 14 to prevent endwise shifting. This alternation is shown in Figs. 14 and 15, in which 6 designates the metal pieces arranged as in Fig. 1, and 15 the insulation pieces arranged as in Fig. 4.

The construction shown in Fig. 5 is similar to that of Fig. 4, except that the inner plate 7 tapers toward its inner end and does not have a flat bottom extending all the way under the rail base as shown in Fig. 4. A wearing plate 18 is shown as interposed between the wooden block 8 and the rail, and the insulation 19 over the base of the rails is of equal thickness throughout instead of being tapered as shown in Fig. 4. The position and correlation of this extra heavy piece of insulation and of the inside metallic plate or bars 17 may also be modified in the manner described in connection with Fig. 4.

Figure 6:
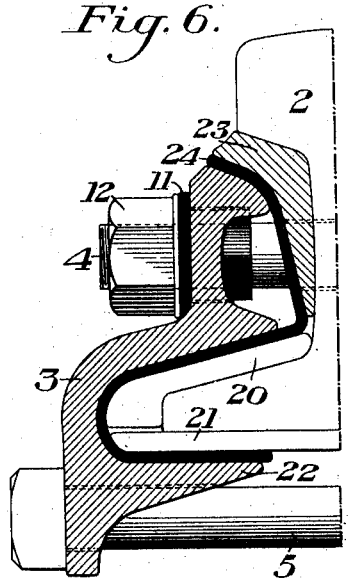

Fig. 6 shows the inner bar members 20 and 21 arranged in a similar manner to the members 6 and 7 in Fig. 1, but in this figure the member 21 is a flat plate which extends outwardly beyond the edge of the rail base, instead of being wedge-shaped as in Fig. 1, the supporting flange 22 of the outer splice bar 3 being correspondingly modified. In this form a separate inner bar 23 fits under the head of the rail and against its web, being separated from the outer bar by the insulation 24, which in this case is shown as a continuous piece of uniform thickness extending around the members 20 and 21 and insulating them from the lower portion of the bar 3.

Figure 7:
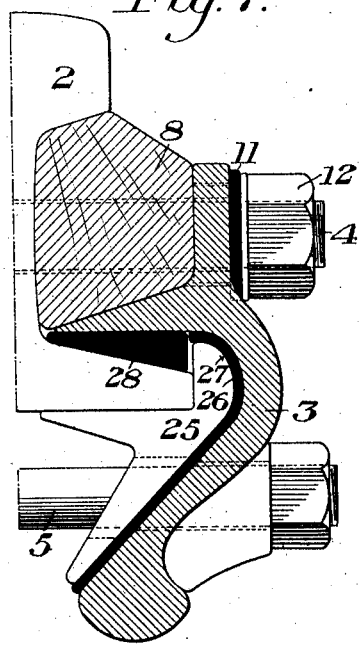

In the construction shown in Fig. 7, the inner bar 25 contacts with the under side of the rail base, and also with its outer edge, and is also extended downwardly and inwardly to provide a bearing face for the insulation 26 at an angle to the horizontal. This bar 25 also extends upwardly beyond the top face of the rail base sufficiently to provide a bearing surface 27 of large radius for the upper portion of the insulation 26, and also to provide for the interposition of an extra thick piece 28 of insulation on top of the rail base of the general form shown in Fig. 4. The position and correlation of this extra heavy insulation, and of the inside metallic plates or bars, may also be modified in the manner described in connection with Fig. 4.

Figure 8:
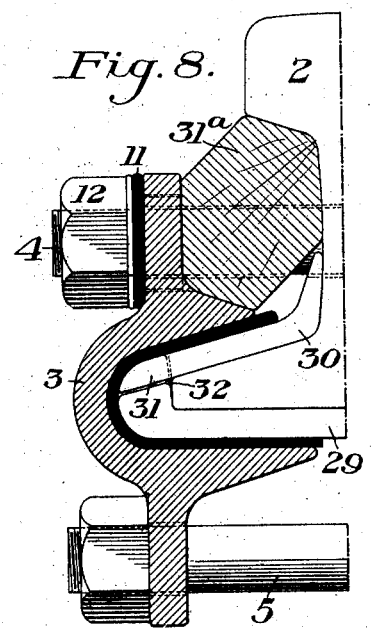

Fig. 8 shows a flat inner base bar 29 extending up along the rail edge to the plane of the top of the rail base. The inner bar 30, which fits the top of the rail foot, also extends outwardly beyond the rail base at its lower end and overlaps the bottom bar. This top bar also extends upwardly along the rail web a sufficient distance to be engaged by the bolts 4, in order to prevent it from slipping out endwise. It is likewise slotted at its lower end, as indicated at 31, to engage a projection 32 on the plate 29 to prevent endwise slipping. In this figure, the wooden block 31ᵃ (corresponding to the block 8 of Fig. 1) is shown of interchangeable form. This block can have the faces bearing against the rail located, without alteration of the form of the block so as to contact with the splice bar, thus presenting a new face to the rail after the original face has become worn, and thus doubling the life of the block.

Figure 9:
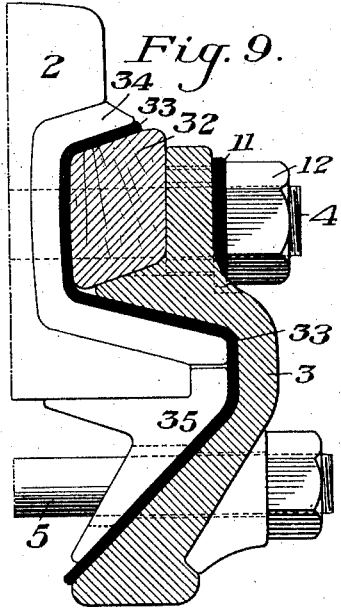

The form shown in Fig. 9 has a reversible block 32 for the same purpose as the block 31ᵃ of Fig. 8, but of somewhat different form, being shaped to support the continuous piece of insulating material 33, and also the inner bar 34. This inner bar is in the form of a channel member fitting against the rail web, the upper flange of the channel extending outwardly underneath the rail head, while its lower flange fits the top of the rail base. The inner base bar 35 is similar to the bar 25 shown in Fig. 7, except that it does not project above the top face of the rail base.

Figure 10:
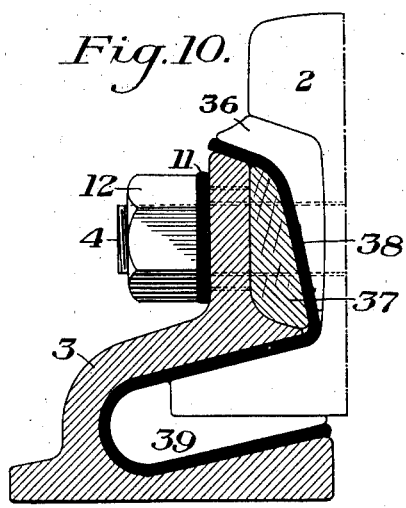

Fig. 10 shows an inner bar 36, contacting with the head and web of the rail and a filler bar 37 separated from the bar 36 by the insulation 38, which also insulates the outer bar 3 from the base of the rail. This filler bar 37 may extend continuously across the joint and opposite the ends of both rails. It may be of metal, wood, or any other suitable filling material. The inner base bar 39 is similar to the one shown in Fig. 5, except that it does not extend above the top face of the rail foot.

Figure 11:
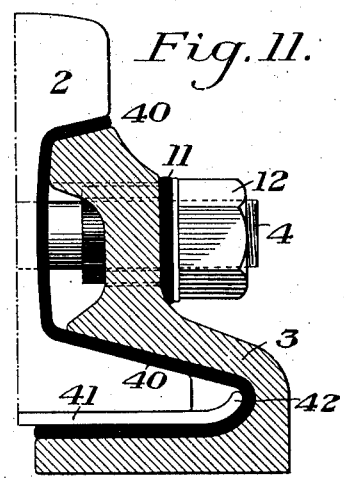

Fig. 11 shows an ordinary chair splice bar separated from the head and foot of the rail by the usual insulation 40. A flat plate 41 is used under the rail base, and is made to extend outwardly beyond the edge of the rail base and to turn upwardly at its outer edge as shown at 42, so as to provide a portion of large radius bearing against the insulated material 40 and thus prevent cutting thereof.

It will be noted that in the form shown in Figs. 10 and 11 there are no connecting bolts 5 below the rail base, as in the other figures, the outer bars 3 being in the form of chairs to rest on the ties, and being without depending flanges or other portions to extend down between the ties.

Figure 12:
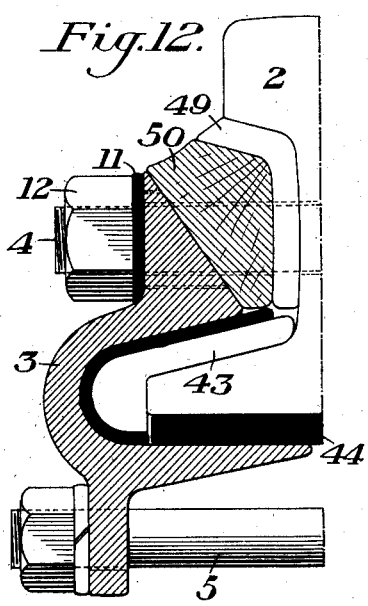

Fig. 12 shows an inner bar 43 fitting the top of the rail base and extending below the bottom of the base to provide for extra thick insulation under the rail base, and also to increase the radius around its outer edge. This extra heavy insulation is indicated at 44, the position and correlation of this insulation and of the inside metallic plates or bars may also be modified in the manner described in connection with Fig. 4, taking into consideration, however, that the bar 43 extending around the rail base lies above the rail base instead of below as in Fig. 4.

Figure 13:
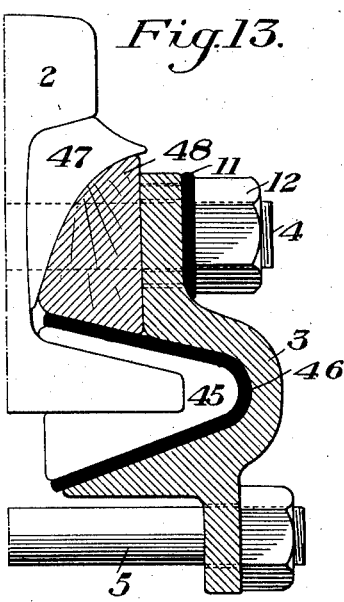

Fig. 13 shows an inner bar 45 fitting both the top and bottom of the rail base, and also extending outwardly beyond the edge thereof to increase the bearing surface for the insulating strip 46, which insulates said bar from the outer splice bar 3. This figure also shows an inner bar 47 fitting underneath the head of the rail and against the web thereof and between the web and non-metallic filler block 48. Fig. 12 also has a similar inner bar 49 and non-metallic filler block 50, although of slightly different form.

In all the forms shown, with the exception of the bar 37 shown in Fig. 10, the inner bars do not extend continuously across the joint, but separate inner bars are provided at each end of the joint in a similar manner to that shown in Figs. 1 and 3.

It will be obvious that the different forms of the invention shown are illustrative only, and that the invention is susceptible of various other modifications, being also applicable to rails of other sections and to outer splice bars of varying sections, in which case the inner splice bars and fillers must of course be correspondingly modified in form. The advantage of using two or more inner bars instead of one, for the purpose of increasing the insulation bearing surface, will be apparent in view of the many combinations and advantages that can be gained by omitting the inner bar from one or more of the rail faces and substituting insulating material or blocks. This cheapens the construction, and provides for extra heavy insulating material at the places where such material is most apt to be pinched out and destroyed.

Separate bars may be used to contact only with the bottom of the rail foot, heavy insulating material being employed instead of metallic inside bars contacting with the top faces, as shown in Figs. 4, 5 and 7, or the reverse arrangement may be used as shown in Fig. 12. All of the rail faces may have bars or plates contacting with them as shown in Figs. 6 and 9. In Fig. 6, three plates are used on each side of each rail end, while in the form shown in Fig. 9 only two of these plates are used; or just the top and bottom faces of the rail bases may have the plates, as shown in Figs. 1, 2 and 8.

The form of bar contacting with one face of the rail base, and extending along its edge to a point beyond the other face of the rail base, is of great advantage in providing extra heavy insulating material at a point where this material is most apt to be destroyed, and also in providing a large radius around the edge of the rail base for the insulation to bear against. This extra heavy insulating material, when used, is located preferably on one flange only of each rail base, being alternated with metal pieces of similar section on the opposite side of the same rail and on the same side of different rails. The use of this one bar to extend the insulating bearing faces beyond the rail base is a very cheap method of construction; and it also involves the least number of parts where this bar fits the lower face and extends beyond both edges of the rail base.

The various arrangements of the inner bars, with the different methods of applying the insulating material, and the filler or insulating blocks, are largely dependent on the kind of outer bar that must be used to meet the different kinds of service.

All the advantages mentioned are, of course, dependent on the use of separate inside bars contacting with the faces on the one side of the one rail end, instead of one continuous bar fitting all or a portion of these faces. In Figs. 4 and 8 we have shown how inside bars and insulating material may be variously interlocked with each other and with the bolts to prevent their slipping endwise; the particular means shown, however, in these figures are only typical, and the particular constructions and combinations shown may be largely varied without departing from the spirit and scope of our invention as defined in the appended claims.

We claim:—

1. In a rail joint, a pair of inner bars both of which contact with only one of the rails and on the same side of said rail, one of which bars has a portion lying above the plane of the bottom face of the rail foot and extending outwardly beyond the outer edge of the rail foot to form a seat for insulating material, and an outer bar insulated from said bars and clamping both of them to the rails.

2. In a rail joint, a pair of inner bars both of which contact with only one of the rails, and an outer bar insulated from said inner bars and clamping both of them to the rail by means of bolts, one of said inner bars contacting with an upper face of the rail base and extending beyond its outer edge and the other of said inner bars contacting with the lower face of the rail base.

3. In a rail joint, a metallic bar or plate contacting with only one rail and terminating at the rail end, said bar to lie entirely below the top of the clamping bolts which pass through the rail web and having a portion above the bottom face of the rail base projecting outwardly beyond the outer edge of the rail base to form a seat on its under side for insulating material.

4. In a rail joint, a metallic inside bar or plate contacting with only one rail and only below the planes of the top faces of the rail base, said bar terminating at the rail end and extending beyond the outer edge of the rail base and above its bottom face, an outer bar overlying and underlying the rail base and clamping said inner bar in contact with the rail, and insulating means interposed between said bars.

5. In a rail joint, a metallic bar or plate contacting with one rail only and terminating at the rail end, said bar extending outwardly beyond both edges of the rail base and forming on its under side a seat for insulating material, a portion of said bar extending above the bottom face of the rail base.

6. In a rail joint, a metallic bar or plate contacting with one rail only and terminating at the rail end, said bar extending outwardly beyond both edges of the rail base and having a portion extending above the bottom face of the rail base, an outer bar, and insulating material between said bars.

7. In a rail joint, a plurality of metallic inner bars and an outer bar opposed to the same side of the same rail, at least one of said inner bars contacting with the upper face of the rail base and extending beyond its outer edge and another of said inner bars contacting with the lower face of the base of the same rail.

8. In a rail joint, a plurality of metallic inner bars and an outer bar opposed to the same side of the same rail, and insulating material between said inner and outer bars, at least one of said inner bars contacting with only one rail and only below the planes of the top faces of the rail base, and having a portion lying above the plane of the bottom face of the rail base.

9. In a rail joint, a plurality of metallic inner bars at least two of which contact with only one of the rails and engage the same side of the rail, and an outer bar insulated from them, at least one of said inner bars extending outwardly beyond both edges of the rail base and having an outer edge beyond the rail base with a greater radius than the radius of an outer edge of the rail foot.

10. In a rail joint, a plurality of metallic inner bars at least two of which contact with only one of the rails on the same side of the rail, and an outer bar insulated from them, at least one of said inner bars contacting with only one rail and only above the plane of the bottom face of the rail base and having an outer edge beyond the rail base with a greater radius than the radius of an outer edge of the rail foot.

11. In a rail joint, a pair of metallic inner bars each contacting with one side of the same rail, and an outer bar insulated from them, one of said bars contacting with the upper face of the rail base and the other contacting with the lower face of the rail base, and one of said inner bars having a curved insulation seat of greater radius than the radius of an outer edge of the rail foot.

12. In a rail joint, a plurality of metallic inner bars, each having a portion which engages the same side of the rail, an outer bar, and insulating material between the outer bar and the inner bars, at least one of said inner bars contacting with only one rail and only above the plane of the bottom face of the rail base and extending outwardly beyond the edge of the rail base.

13. In a rail joint, a plurality of metallic inner bars contacting with the same side of the same rail and each contacting with the one rail only, and an outer bar clamping them to the rails, at least two of said inner bars extending beyond the outer edge of the rail foot.

In testimony whereof, we have hereunto set our hands.

WILLIAM P. THOMSON.
SAMUEL G. THOMSON.

Witnesses:
S. E. PATTERSON,
McLEOD THOMSON.